Feb. 24, 1970 H. L. BLASBALG ET AL 3,497,627

RATE CONVERSION SYSTEM

Filed April 15, 1966 6 Sheets-Sheet 1

INVENTORS.
H. BLASBALG
J. HAYASE
H. NAJJAR

BY Maurice H. Klitzman
ATTORNEY

Feb. 24, 1970 H. L. BLASBALG ET AL 3,497,627

RATE CONVERSION SYSTEM

Filed April 15, 1966 6 Sheets-Sheet 3

Feb. 24, 1970 H. L. BLASBALG ET AL 3,497,627

RATE CONVERSION SYSTEM

Filed April 15, 1966 6 Sheets-Sheet 6

United States Patent Office 3,497,627

Patented Feb. 24, 1970

3,497,627
RATE CONVERSION SYSTEM

Herman L. Blasbalg, Baltimore, and Joshua Y. Hayase, Bethesda, Md., and Hann F. Najjar, Annandale, Va., assignors to International Business Machines Corporation, Armonk, N.Y., a corporation of New York Filed Apr. 15, 1966, Ser. No. 542,935
Int. Cl. H01j 3/06
U.S. Cl. 179—15 4 Claims

ABSTRACT OF THE DISCLOSURE

The invention relates to a rate conversion system comprising a rate converting means and a decomposing means for converting an input signal of a non-standard rate into a plurality of output signals of a standard rate of the form $2^n k$ c.p.s. while employing less dummy bits than used in the prior art.

This invention relates to a rate conversion system and more particularly to a system for converting an input signal of a non-standard rate into a plurality of output signals each of which is a multiple of a predetermined standard rate. The invention herein described was made in the course of or under a contract with the United States Army.

In time division multiplexing of the type disclosed in the copending application entitled Adaptive Digital Communication System, Ser. No. 542,934, filed by H. Blasbalg et al. this same day and assigned to the assignee of the present application; it is necessary to provide input signals with rates that are multiples of one another.

In time division multiplexing it is necessary to allocate time slots in a multiplex frame in accordance wtih the rate of the input signals. If the input signals are at different rates they must be sampled at different rates. This means that the signals must be represented a different number of times in a given multiplex frame. Further each rate must be an integer multiple of each other rate. Otherwise, it is not possible to maintain the same number of samples from one multiplex frame to the next. If this manner of handling signals is not desired, an alternative is to take the lower rate input and convert it to a submultiple of a higher rate.

The latter solution is the prior art approach as disclosed in Computer Design, February 1966, (Experimental PCM System Transmits 224 Million Bits Per Second) has been to "stuff" the lower speed signals until they are at a rate which is an exact sub-multiple of the line rate of the high speed signal. For example, if the higher rate were 3½ times the lower rate, the lower rate would be "stuffed" until it became an integer sub-multiple of the higher rate, i.e., a ratio of 3 to 1. This technique is very inefficient in that a great number of dummy bits must be "stuffed" into a signal, especially if the particular signal to be "stuffed" has a rate that is relatively far removed from the desired rate.

The rate conversion system of the invention herein is one that provides a time division multiplexer with signals that are at a standard rate. Standard rates are to be defined as exact multiples of a predetermined fixed rate. A signal entering the rate conversion system at a non-standard rate, i.e., a rate that is not an exact multiple of the predetermined fixed rate, is converted to a plurality of signals at rates that are multiples of a predetermined standard rate with a minimum of bit "stuffing."

Accordingly, it is an object of this invention to efficiently convert a signal at a non-standard rate to a plurality of signals that are all at rates which are integer multiples of a predetermined standard rate, and can be readily multiplexed with other standard rate inputs without utilizing an excessive number of dummy bits.

More specifically, it is an object of this invention to increase the rate of a continuous data bit stream at a non-standard rate to a continuous bit stream at a higher rate which is readily decomposable ino a plurality of standard rates.

Further, it is an object of this invention to decompose a signal, the rate of which has been increased to a higher rate, into a plurality of signals, each at a rate that is an integer multiple of a predetermnied standard rate.

The foregoing and other objects, features and advantages of the invention will be apparent from the following more particular description of preferred embodiments of the invention, as illustrated in the accompanying drawings.

In accordance with one aspect of this invention, a rate converter is provided with means to read data into a register at a non-standard rate and means to read the same data out of said register at a higher rate. To maintain a continuous bit stream at the output of the rate converter, a predetermined number of dummy bits are added to the output signal.

In accordance with another aspect of this invention, the output signal of the rate converter is decomposed into a plurality of signals. Timing means are provided to direct the output signal of the rate converter, which is a continuous bit stream, to appropriate channels. According to the timing scheme, data bits are gated into predetermined frequency channels. These frequency channels are each at a frequency rate that is an integer multiple of a predetermined standard rate so that the signals are transformed to a desired rate.

Figure 1:
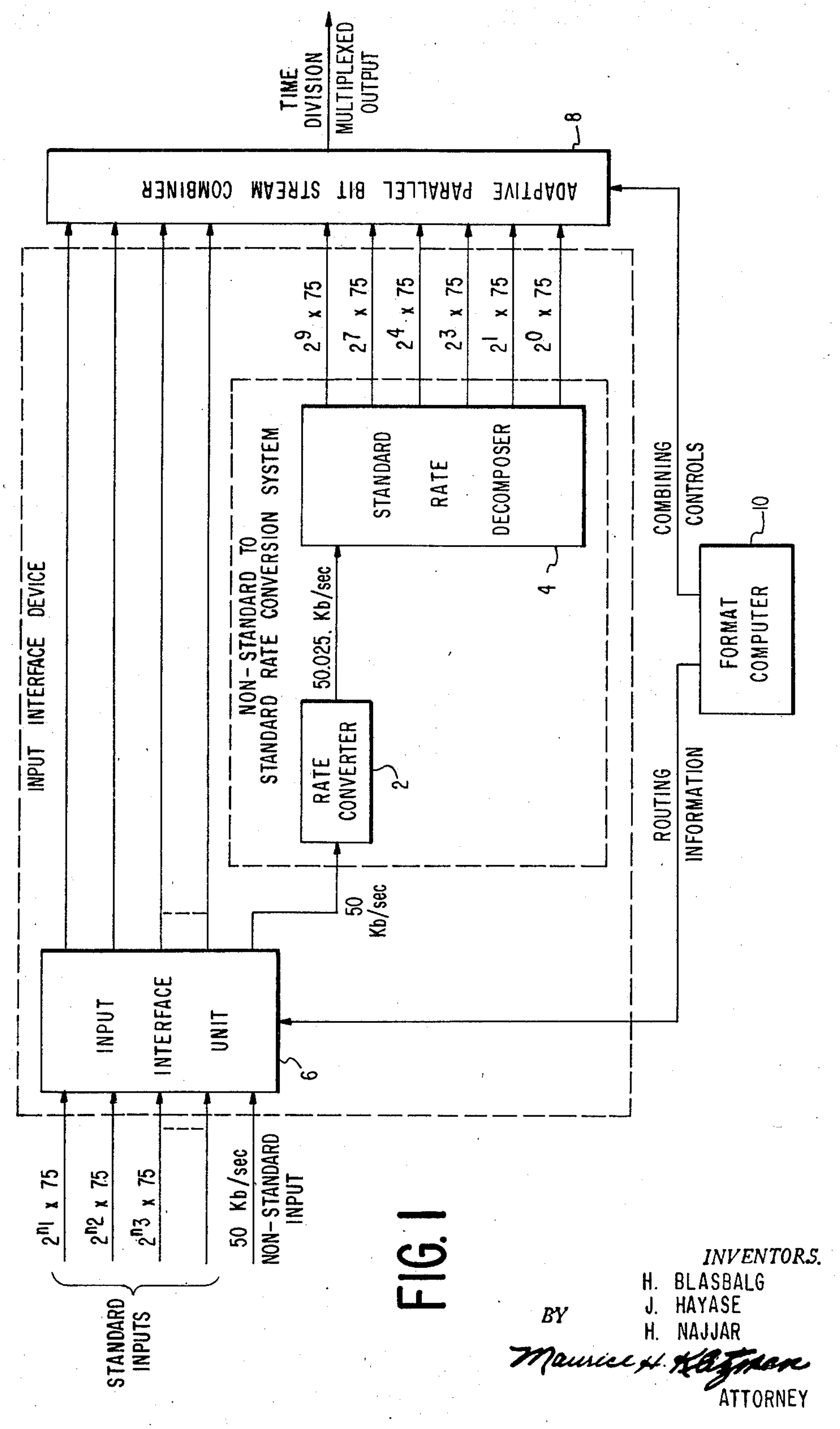
FIG. 1 is a block diagram of the rate conversion system of this invention.

Referring to FIG. 1, it is shown how the system of this invention receiving a plurality of inputs at both standard and non-standard rates, produces a single time division multiplexed output.

In the drawing, rate converter 2 is provided for receiving a non-standard rate input and producing an output of a higher rate, by bit stuffing. The rate of the output signal of the rate converter is higher than the rate of the input signal. Also, this higher rate is equal to the sum of a plurality of multiples of a standard rate. The detailed operation of the rate converter 2 will be explained in the discussion of FIG. 3.

Standard rate decomposer 4 is provided and is responsive to the output of rate converter 2. It is the purpose of standard rate decomposer 4 to break the output signal of rate converter 2 down into a plurality of signals that are at multiples of a standard rate. The detailed operation of standard rate decomposer 4 will be discussed in the explanation of FIG. 4.

Input interface unit 6 is provided for forming an interface between the various input lines and the multiplexer. It provides the multiplexer with inputs which have a common logic level and common timing. This interface unit 6 provides for the routing of each input lines to the proper unit of the adaptive parallel bit stream combiner 8. The routing information is received from the format computer 10.

Adaptive parallel bit stream combiner 8 accepts the binary inputs of the various rates (but derived from a common clock) and multiplexes them into a single binary signal of rate and format dictated by the format computer.

Format computer 10 controls the format of the final time division multiplexed output by controlling the input interface unit 6 and the adaptive parallel bit stream combiner 8. The format is determined from externally supplied status information (i.e., rate and priority of each input) and link rate.

The detailed description of input interface unit 6, adaptive parallel bit stream combiner 8, and format computer 10 is disclosed in the copending application referenced above.

Figure 3:
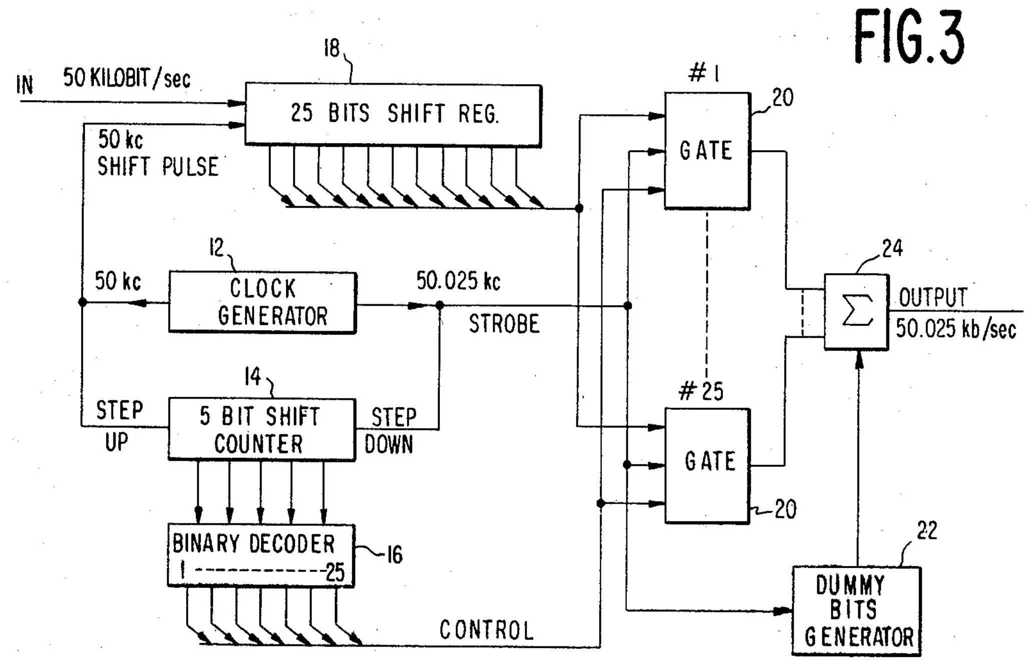
FIG. 3 is a detailed block diagram of one embodiment of the rate converter.

One embodiment of the rate converter 2 of FIG. 1 is shown in FIG. 3. For the purposes of illustrating the rate converter in FIG. 3, it will be assumed that it is desired to convert a 50 kilobit per second input signal into a continuous bit stream containing 50.025 kilobits per second.

Clock generator 12 is provided for generating clock pulses of two different frequencies. The first of said frequencies is at the rate of the input signal or, in this example, at 50 kc. The second of said frequencies is at the frequency of the desired output rate or, in this example, 50.025 kc. The 50 kc. output of said clock generator is utilized for gating the input signal into 25 bit shift register 18. 25 bit shift register 18 is a small storage device for the incoming bit stream. The 50 kc. output of clock generator 12 is also used to step up a 5 bit shift counter 14. The 50.025 kc. output of clock generator 12 is used to step down 5 bit shift counter 14. Binary decoder 16 is responsive to the output of 5 bit shift counter 14 and provides a control signal to each of gates 20. Gates 20 are also responsive to the 50.025 kc. output of clock generator 12. For this reason, signals are read out of 25 bit shift register 18 at a faster rate than they are read into the 25 bit shift register 18, thereby permitting dummy bit generator 22 to insert 25 bits per second into the bit stream at Σ circuit 24.

In operation, the following example will serve to illustrate the bit rate conversion. Assume that the 25 bit shift register 18 is empty and therefore 5 bit shift counter 14 is at count 1. When data is received, every time a bit is strobed in to 25 bit shift register 18, the 50 kc. pulse of clock generator 12 steps up 5 bit shift counter 14 by 1 count. When the register is full, 5 bit shift cunter 14 will indicate a count of 26. At that time the 50.025 kc. output of clock generator 12 starts and begins to step down 5 bit shift counter 14. The leading edge of the 50.025 kc. output of clock 12 is then used to strobe out the data from 25 bit shift register 18. This means that all the bits in 25 bit shift register 18 will be gated with the corresponding counts in 5 bit shift counter 14 together with strobe signals that are generated by the leading edge of the 50.025 kc. output of clock 12. The outputs of gates 20 are then OR gated together to form an output. Each of the gates 20 will provide 2,000 bits before 25 bit shift register 18 is empty. At a time when 25 bit shift register 18 is empty, 50,000 bits will have been extracted from the 25 positions of 25 bit shift register 18 and at that time, dummy bit generator 22 will provide the Σ gate 24 with 25 dummy bits. Meanwhile, as dummy bits are provided at Σ gate 24, 25 bit shift register 18 is being filled, 5 bit shift counter 14 is being stepped up with the 50 kc. output of clock generator 12, and the 50.025 kc. output of clock generator 12 is suppressed. When 25 bit shift register 18 is full again, 5 bit shift counter 14 will be sitting at a count of 26 again and at this time the 50.025 kc. output of clock generator 12 starts again to step down the count in bit shift counter 14. Signals are then extracted from 25 bit shift register 18 as before.

Figure 4:
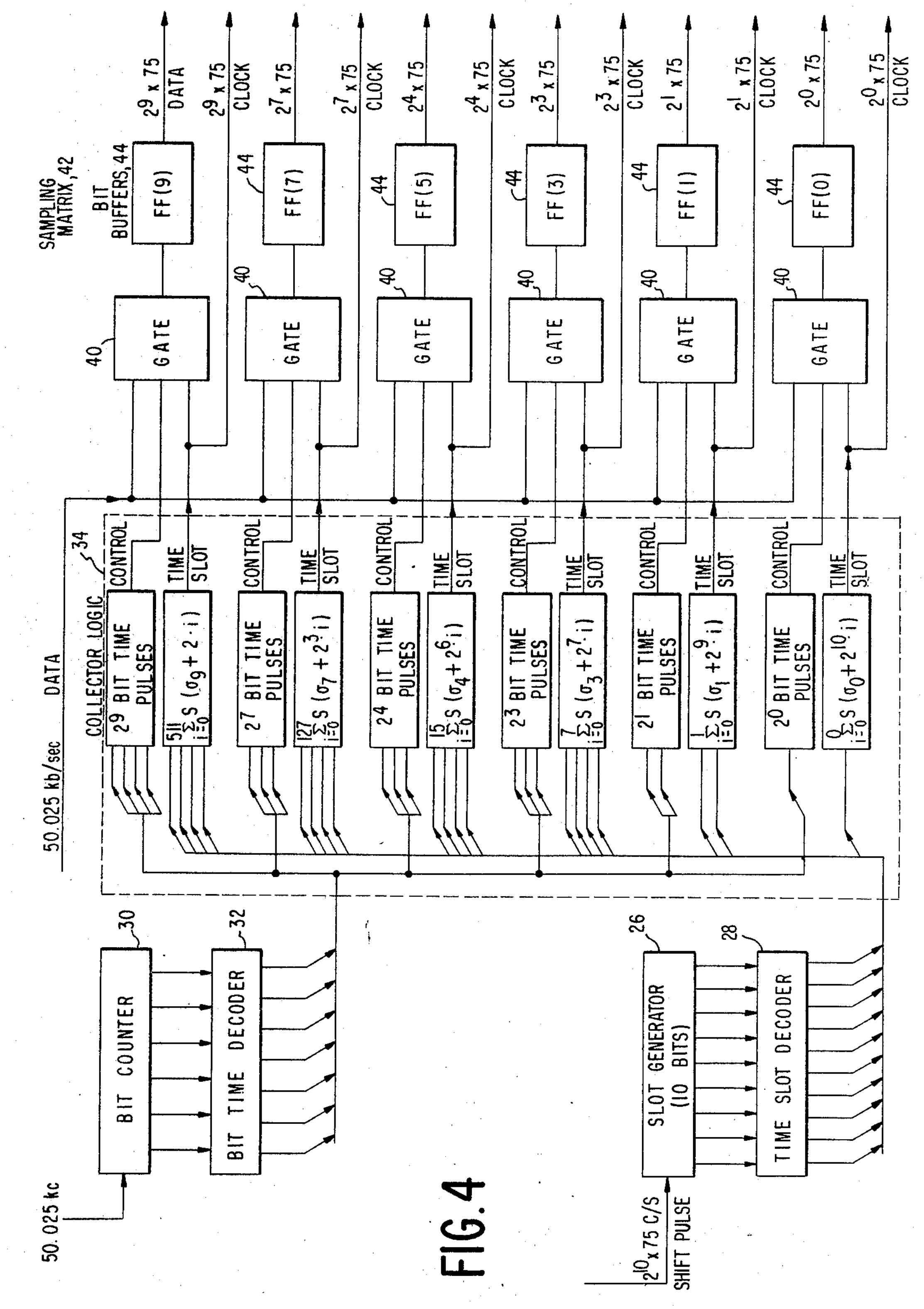
FIG. 4 is a detailed block diagram of one embodiment of the standard rate decomposer.

Having converted the 50 kilobit per second signal to 50.025 kilobits per second, it is necessary to decompose the latter rate into a plurality of rates, each of which is a multiple of a predetermined fixed rate. The block diagram of FIG. 4 shows the standard rate decomposer for accomplishing the desired result. A predetermined fixed rate is in the form of a $2^n \times k$ bits per second. A standard rate is any integer multiple of said fixed rate. For purposes of illustration, the number 75 is selected as a constant being equal to $k$. Thus, a fixed rate will be in the form of $2^n \times 75$, and standard rates will be any multiples of the fixed rate where $n$ is any integer. It can be mathematically determined that 50.025 kilobits per second, when decomposed into a plurality of standard rates, will be in the form of: $2^9 \times 75$, $2^7 \times 75$, $2^4 \times 75$, $2^3 \times 75$, $2^1 \times 75$, and $2^0 \times 75$ bits per second.

Figure 2:
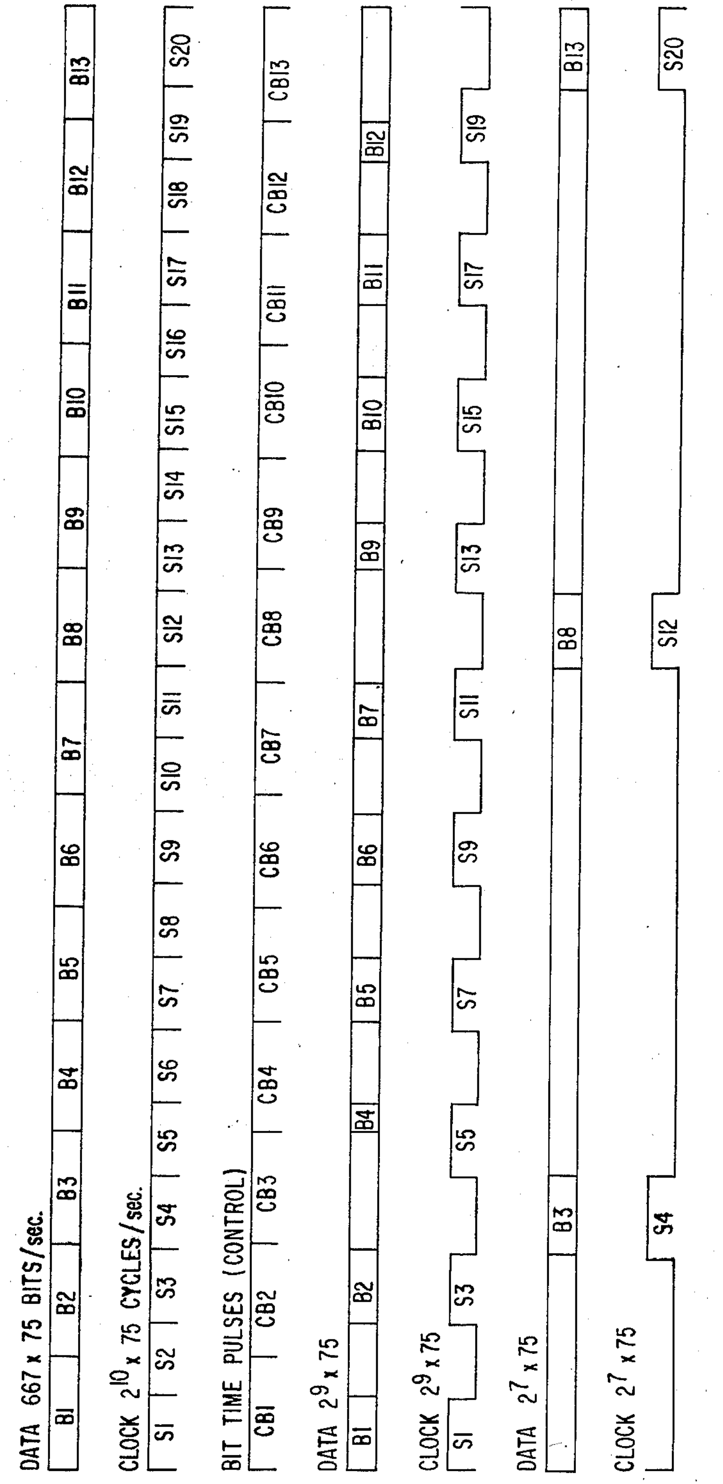
FIG. 2 is a timing diagram showing the operation of the standard rate decomposer of FIG. 4.

In accordance with the example set forth in this illustration, FIG. 2 shows a timing diagram for the distribution of a portion of the decomposed bit stream. In order to decompose a 50.025 kilobit per second signal into a plurality of standard rates as shown in FIG. 2, it is necessary to provide at least $2^{10}$ time slots within a frame of $1/75$ second. 667 of these time slots are then utilized for extracting the appropriate bits from the output of the rate converter to provide the above rates. The slots chosen for each standard rate will be periodical and their rate will define that of the channel. Therefore, it is important not only to consider the number of slots needed (in this example 667) but also the relative positions of these slots with respect to the 667 bits within the frame.

In operation, the decomposing of the 50.025 kilobits per second signal is accomplished by the standard rate decomposer 4 of FIG. 1 which is shown in detail in FIG. 4. Referring again to FIG. 4, it can be seen that data entering at 50.025 kilobits per second is one input to all of gates 40.

In order for data to be passed through any particular gate 40, both a control pulse and a time slot pulse must be present.

First, the source of the time slot pulse will be explained. Slot generator 26 is provided and is responsive to a shift pulse at a frequency of $2^{10} \times 75$ c./s. The $2^{10} \times 75$ c./s. pulse can be produced by a standard clock generator, known to those skilled in the art. The output of slot generator 26, in response to said input shift pulse, is $2^{10}$ time slots. As has been mentioned, of the $2^{10}$ time slots that are provided, only 667 time slots are needed to sample the data, the remaining time slots will be discarded by time slot decoder 28, since there is no use for them. In other words, time decoder 28, responsive to the slot generator 26, will decode only those slots that are used for correct sampling. These slots are then grouped according to the rate of a particular channel, and then are gated through gates 40 with the data together with the control pulses that define individual bits. In other words, time slot decoder 28 being responsive to the output of time slot generator 26 provides the necessary time slots (in this case 667) in their correct positions within a time frame to collector logic 34. Collector logic 34 is provided and comprises two types of blocks. The first type of said blocks, labeled "bit time pulses," comprises a plurality of OR gates. It is the purpose of these blocks to provide control pulses for defining the bits that will go to each sub-channel. The second type of said blocks, having a time slot output, are single word detectors. The information printed in these blocks is a mathematical expression defining the time slots that will constitute a given rate of a given sub-channel.

It is possible, however, for one of these time slots to overlap two bits of data. To prevent error due to such overlap bit counter 30 and bit time decoder 32 are provided. Bit counter 30 is responsive to a clock pulse of 50.025 kc. Since bit counter 30 is responsive to the same clock pulse as gates 20 and dummy bit generator 22 of FIG. 3, its outputs will occur at the same time and for the same duration as the data bits. Bit time decoder 32 is responsive to these output pulses of bit counter 30 and provides the appropriate section of collector logic 34 with pulses simultaneously with and of the same duration as the data bit pulses. The particular portion of collector logic 34 that will receive said pulses is determined by the particular bit count. Consequently, signals are passed through gates 40 in response to a combination of control pulses and time slot pulses. As was previously mentioned, the control pulses and the data bits occur simultaneously; however, the time slot pulses occur at a time independent of these other pulses. Consequently, due to varying degrees of overlap, the outputs of gates 40 are at varying widths.

In order to shape the pulses to conform to a uniform width, appropriate to their particular data rates, sampling matrix 42 comprising bit buffers 44 is provided. Bit buffers 44 produce pulses of uniform width in response to the output of gates 40. The widths of these pulses vary according to the particular data channel. For example, in the bit stream of the $2^9 \times 75$ data channel, the pulses are equal to $\frac{1}{2^9 \times 75}$ in width. In the bit stream of channel $2^1 \times 75$, however, the bit pulses are equal to $\frac{1}{2^1 \times 75}$ in width. These outputs are the outputs of standard rate decomposer 4 as seen in FIG. 1.

While the invention has been shown and described with respect to a particular embodiment thereof, various changes in form and detail may be made therein. For example, see FIG. 5 for an alternate embodiment of rate converter 2 of FIG. 1. In this example, assume that it is desired to increase the non-standard rate of 50 kilobits per second to 50.4 kilobits per second which is a rate that can be decomposed into a plurality of multiples of a standard rate.

Clock generators 12A, which is provided, is similar to the clock generator 12 of FIG. 3. The 50 kb. data and the 50 kc. clock are in phase. As was explained earlier, the second frequency output of said clock generator must be of a frequency equal to the rate of the desired output. In this example, therefore, since a bit rate of 50.4 kilobits per second is desired, the second frequency output of said clock generator must be 50.4 kc. Data is gated into 1 bit buffer 45 at 50 kc. and is gated out at 50.4 kc. A dummy bit is provided by a dummy bit generator 41 similar to the dummy bit generator 22 of FIG. 3, every 2.5 ms., so that the output of gate 47 is a continuous bit stream at a rate of 50.4 kilobits per second.

Figure 5:
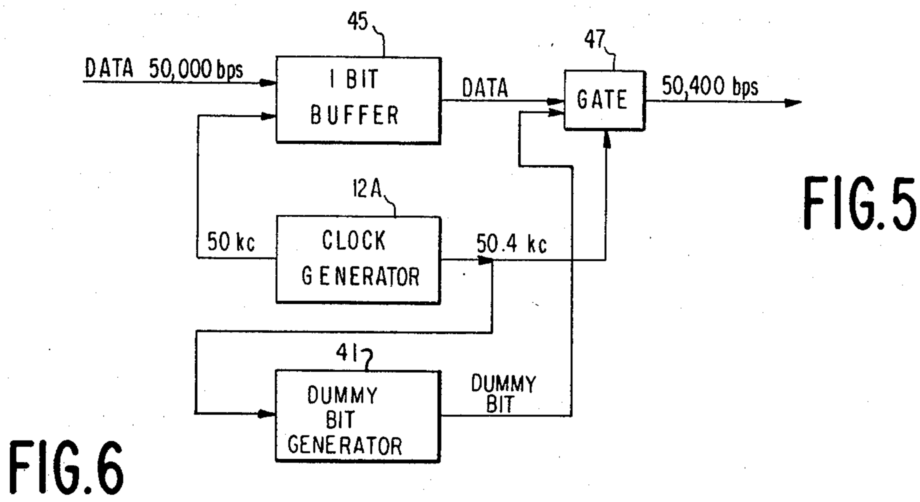
FIG. 5 is a diagram of an alternate embodiment of the rate converter.
Figure 6:
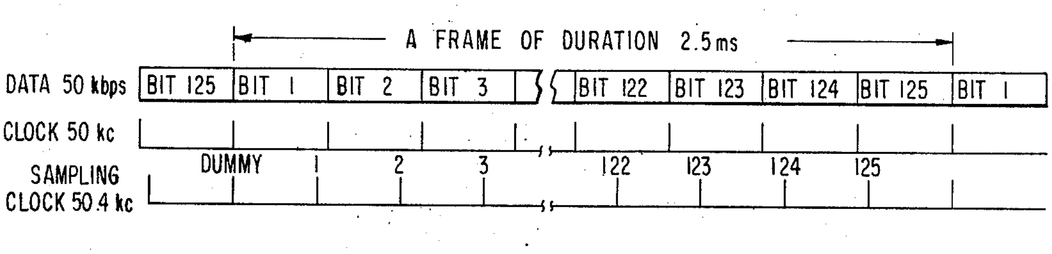
FIG. 6 is a timing diagram for the circuit of FIG 5.

For the operation of the circuit of FIG. 5, see the timing diagram of FIG. 6. At the start of a frame of duration 2.5 ms. a dummy bit is gated through gate 47 and bit 1 is stored in the 1 bit buffer. Data bits are then gated out of 1 bit buffer 45 at 50.4 kc. and gated into 1 bit buffer 45 at 50 kc., until 125 data bits have been gated through gate 47. At this point, a new dummy bit is provided and a new frame of 2.5 ms. duration begins. As an alternative to the circuit of FIG. 5, two 1 bit buffers could be provided to replace 1 bit buffer 45. The input and output operations would be alternated between the two buffers at the end of each frame of duration 2.5 ms. The use of two buffers instead of the one buffer shown in FIG. 5 would make timing less critical.

The inventive features of standard rate decomposer 4 (see FIG. 1) may also be practiced with alternate embodiments. For example, in FIG. 7, decomposing means is provided to decompose a signal at 50.4 kilobits per second to three distinct output signals, each of said output signals being at a rate that is a multiple of a predetermined fixed rate. A 5 bit counter 52 that counts up to 21 driven by a 50.4 kc. clock, and a 21 positions decoder 54 which detects each count are provided. The 50.4 kc. clock input comes from clock generator 12A of FIG. 5. The output of the decoder is used as a control to identify the 21 bits within a frame. Bit 1 of each frame is entered in the 1 bit buffer, bits 2, 7, 12 and 17 are entered in the 5 bit buffer and the remaining bits are entered in the 16 bit buffer. While the data is being fed into these buffers at the rate of 50.4 kilobits per second, the same data is being extracted from each buffer at the appropriate rate of the subchannel. Data is extracted from each buffer by collecting it from different bit positions. Each bit position is identified by a count provided by a separate counter associated with that buffer. In operation, the bits passing through the 1 bit buffer 48 are gated through gate 56 by a clock pulse of a frequency of a desired rate. Bits from 4 bit buffer 49 and 16 bit buffer 50 are transferred in parallel to collector logic 58 and 64 respectively. Collector logic 58 and 64 comprise a plurality of gates. It is the purpose of collector logic 58 and 64 to gate out the outputs of bit buffers 49 and 50 at the rates of $2^7 \times 75$ and $2^9 \times 75$ respectively under the control of position word detectors 62 and 66 and the respective clock pulses. Data bits are gated out of collector logic 58 in response to pulses from four positions word detector 62, said word detector acting in response to 2 bit counter 60. Data bits are gated through collector logic 64 in response to control pulses from 16 positions word detector 66, which acts in response to 4 bit counter 68. Thus, it can be seen that the embodiment of FIG. 7 decomposes a signal into a plurality of signals at rates that are a multiple of a predetermined standard rate. It should be noted that the common frame between the decomposed rates is of a duration $\frac{1}{2^5 \times 75}$ seconds. This means that during an interval of $\frac{1}{2^5 \times 75}$ seconds each of the bit buffers 48 to 50 will process 1, 4 and 16 bits respectively within this time interval, while the input rate of 50.4 kilobits per second will also process 21 bits within the same time interval.

Figure 8:
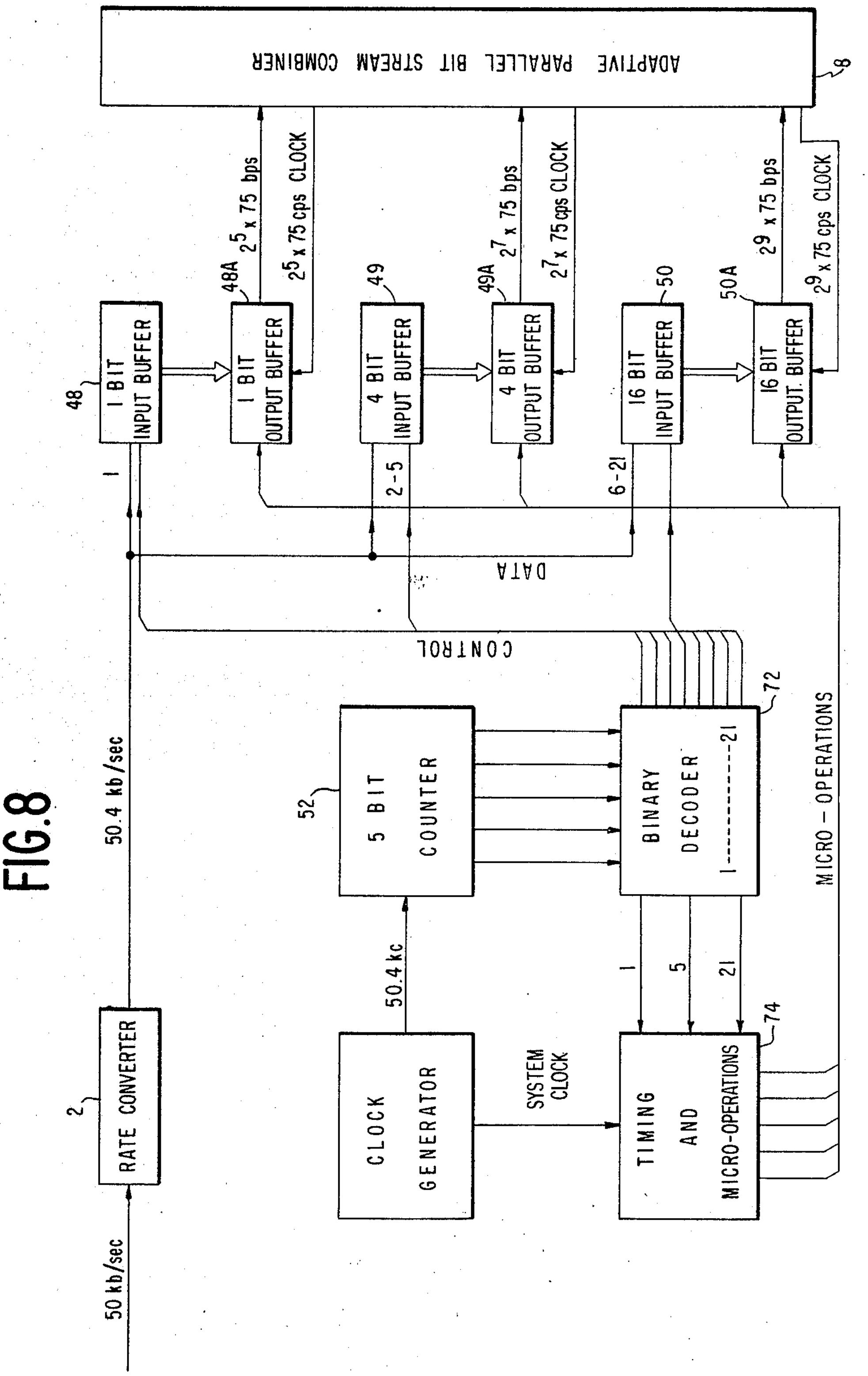
FIG. 8 is another alternate embodiment of the standard rate decomposer.

Still another way of decomposing a rate is the "double buffer" approach shown in FIG. 8. Here again, for the purpose of showing a specific example, a 50.4 kilobit per second signal is decomposed into a plurality of signals which are each at a rate that is a multiple of a predetermined fixed rate.

Figure 7:
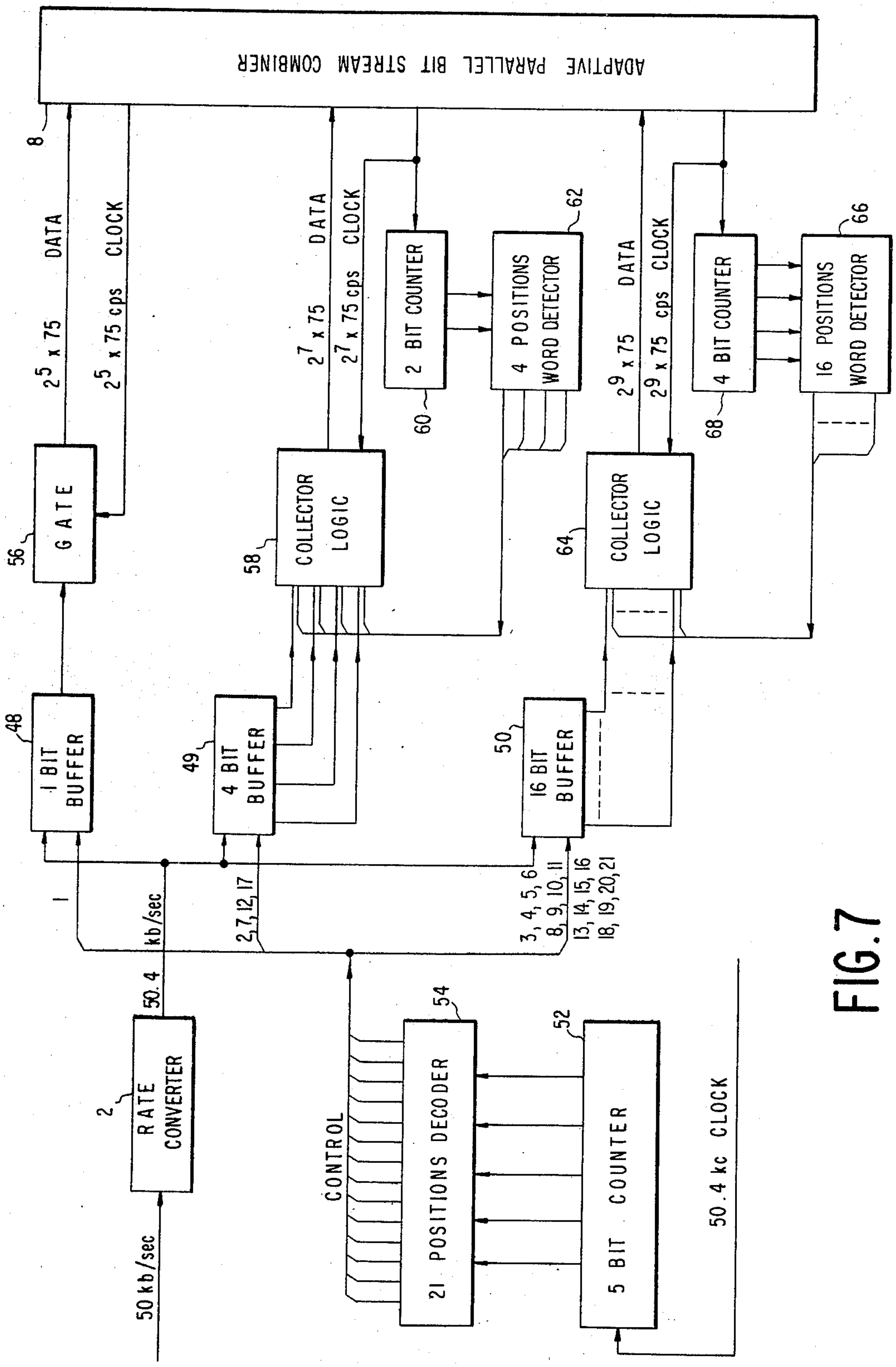
FIG. 7 is a block diagram of an alternate embodiment of the standard rate decomposer.

As in FIG. 7, a 5 bit counter 52, responsive to a 50.4 kc. clock is provided. Binary decoder 72 is provided. Binary decoder 72 detects the output of 5 bit counter 52 and gates data bits to their appropriate buffers 48 to 50. Binary decoder 72 has additional outputs at times when a 1 bit, a 5 bit, or a 21 bit are being decoded into an appropriate buffer. Timing and microoperations 74 are provided which in response to the latter named outputs of binary decoder 72 transfer data bits out of output buffers 48A, 49A, and 50A at a frequency equal to the appropriate output rate. Clocking means are provided and the frequency of the system clock is much faster than 50.4 kc. to allow the generation of the timing within each bit.

As a specific example, bit 1 is entered in the 1 bit input buffer 48, bits 2 through 5 are entered into the 4 bit input buffer 49 and bits 6 through 21 are entered in 16 bit input buffer 50. As soon as each of said input buffers is full, its contents are transferred in parallel to its companion output buffer, i.e., buffers 48A, 49A, and 50A. The bits are transferred out of said output buffers as was previously described. It takes exactly a period of one frame duration ($\frac{1}{2^5 \times 75}$) to fill the input buffers. The procedure of filling and emptying the input and output buffers is repeated every frame.

Thus, it can be seen that there are various embodiments which can be utilized to practice the concept of the disclosed invention.

While the invention has been particularly shown and described with respect to certain preferred embodiments thereof, it will be understood by those skilled in the art that the foregoing and other changes in form and detail may be made therein without departing from the spirit and scope of the invention.

We claim:

1. A conversion system for converting input signals of a non-standard rate to a plurality of output signals while maintaining the intelligence of said input signal, each of said output signals having a standard rate of the form $2^n \times k$ c.p.s., where $k$ is a base constant and $n$ is a positive whole integer, comprising;

a rate converter for increasing said input signal of said non-standard rate to a second signal of a multiple rate which is a whole multiple of said base constant $k$ but lower than the next standard rate above said non-standard rate; and a decomposing means connected to said rate converter for decomposing said second signal of said multiple rate into a plurality of output signals, each of said output signals being of the form $2^n \times k$ c.p.s.

2. The system in claim 1 wherein the rate converter comprises;

a clocking means for providing clock pulses of two distinct frequencies, a first frequency and a second frequency, said first frequency being equal to and in phase with said non-standard rate of said input signal and said second frequency being equal to said multiple rate of said second signal;

a one bit buffer for receiving said input signal, said input signal being gated into said buffer at said non-standard rate by said first frequency from said clocking means, said buffer gating out a second signal at said multiple rate under the control of said second signals from said clocking means;

generating means for generating dummy bits, the number of said dummy bits being equal to the difference between said first and second frequencies of said clocking means;

summing means connected to said one bit buffer and to said generating means for combining the output of said buffer and said dummy bits generated by said generating means into a continuous bit stream at said multiple rate which is equal to said second frequency of said clocking means.

3. The system of claim 1 wherein the decomposing means comprises:

a plurality of buffers, each of said buffers having a first input of said second signal;

a first decoding means connected to said plurality of buffers for gating into each of said plurality of buffers a selected portion of said second signal;

a second generating means having a plurality of outputs, each of said outputs of said second generating means being a frequency that has a rate of the form $2^n \times k$ c.p.s.;

a plurality of second detectors, each of said second detectors having as an input one of said outputs from said second generating means;

a plurality of gating means, each of said gating means being connected to the output of one of said plurality of buffers, each of said gating means having a second signal of one of said outputs from said second generating means, and selected ones of said gating means being connected to one of said plurality of second detector means, the output of said gating means being an output signal having a rate of the from $2^n \times k$ c.p.s.

4. A time division multiplexing system for multiplexing a plurality of input signals, one of said input signals being at a non-standard rate and the remainder of said input signals being at standard rates of the form $2^n \times k$ c.p.s., where $k$ is a base constant and $n$ is equal to a whole positive integer, comprising;

a rate converter for increasing said input signal of said non-standard rate to a second signal of a multiple rate which is a whole multiple of said base constant $k$ but less than the next standard rate above said non-standard rate;

a decomposing means connected to said rate converter for decomposing said second signal of said multiple rate into a plurality of output signals, each of said output signals having a rate of the form of $2^n \times k$ c.p.s.;

combining means for time division multiplexing the plurality of output signals of said decomposing means and the plurality of input signals of said standard rates, to form a continuous bit stream.

References Cited

UNITED STATES PATENTS

| | | | |
|---|---|---|---|
| 2,884,615 | 4/1959 | Garfinkel | 178—50 |
| 2,911,473 | 11/1959 | Van Duuren | 178—50 |
| 3,051,929 | 8/1962 | Smith | 340—172.5 |
| 3,090,943 | 5/1963 | Lewis | 340—172.5 |
| 3,194,889 | 7/1965 | McAdams | 179—15 |
| 3,303,475 | 2/1967 | Hellerman et al. | 179—15 |

OTHER REFERENCES

Computer Design, "R&D Reports," pp. 20–21, February 1966, vol. 5.

WILLIAM C. COOPER, Primary Examiner

ALBERT B. KIMBALL, JR., Assistant Examiner

U.S. Cl. X.R.

178—50; 328—104; 340—172.5